Louis W. McDermott, INVENTOR.

April 13, 1954  L. W. McDERMOTT  2,675,248
LATERALLY EXTENDING VERTICALLY SWINGABLE
HITCH FOR USE WITH COMBINES
Filed March 10, 1953  2 Sheets-Sheet 2
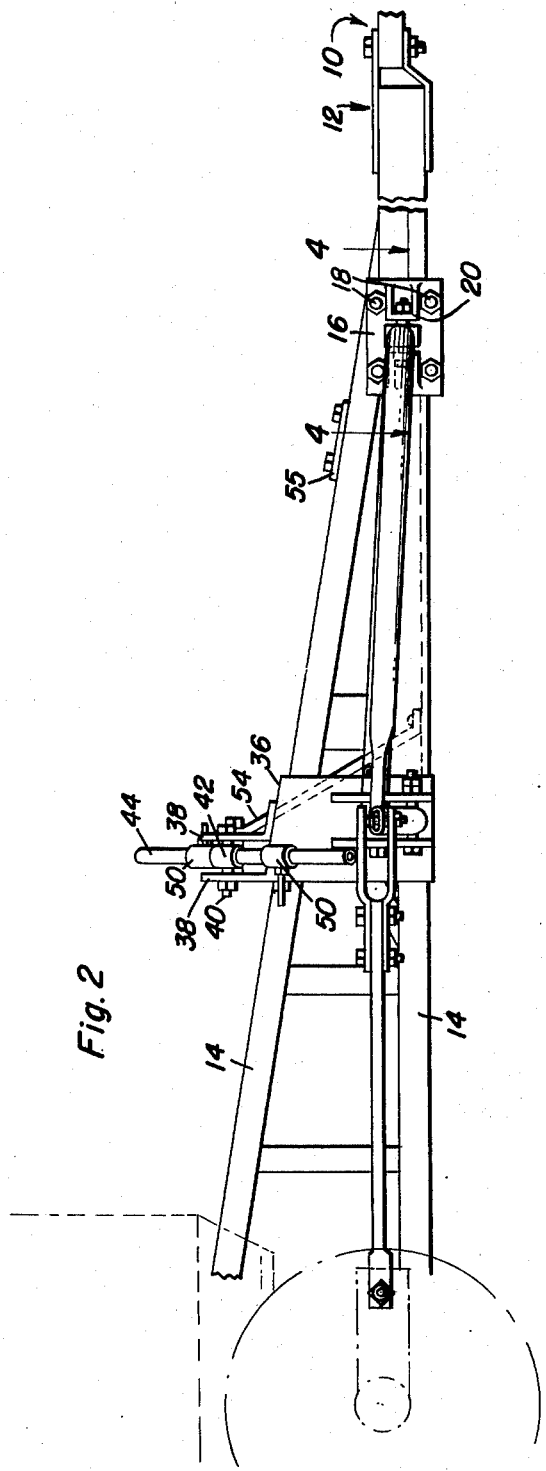
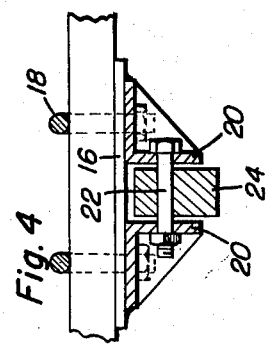
Louis W. McDermott
INVENTOR.

Patented Apr. 13, 1954

2,675,248

UNITED STATES PATENT OFFICE 2,675,248

LATERALLY EXTENDING VERTICALLY SWINGABLE HITCH FOR USE WITH COMBINES

Louis W. McDermott, Dyersville, Iowa

Application March 10, 1953, Serial No. 341,388

4 Claims. (Cl. 280—412)

This invention relates to novel and useful improvements in draft hitches and more specifically relates to a hitch for use with combines enabling a trailer or wagon to be positioned laterally thereof when the combine is being towed.

A primary object of this invention is to provide a draft hitch specifically adapted to position a trailer or wagon at the side of a combine while at the same time connecting the trailer thereto for substantially independent vertical motion.

Another object of this invention is to provide a hitch of the character described which permits a trailer to be rapidly connected and disconnected to the combine structure.

Another object of this invention is to provide a draw bar hitch assembly for a combine which may be swung upwardly to the side of the combine when not in use.

Another object of this invention is to provide improved means for limiting the pivotal movement of the draw bar so that the latter may be conveniently positioned enabling the top of a trailing wagon or other vehicle to be readily attached or detached to the draw bar.

Another object of this invention is to provide a draft hitch which incorporates a supporting bar provided with adjustable stop means for varying the limit points for the pivotal movement of the hitch assembly with relation to the tow bar of a combine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a vertical elevational of the assembly shown in Figure 1;

Figure 3 is a vertical section taken substantially along the plane of section line 3—3 of Figure 1 and showing details of one of the stop members on an enlarged scale; and Figure 4 is a horizontal elevational taken substantially along the plane of section 4—4 of Figure 2 and showing the manner of attaching the brace members in an enlarged scale.

Figure 1:
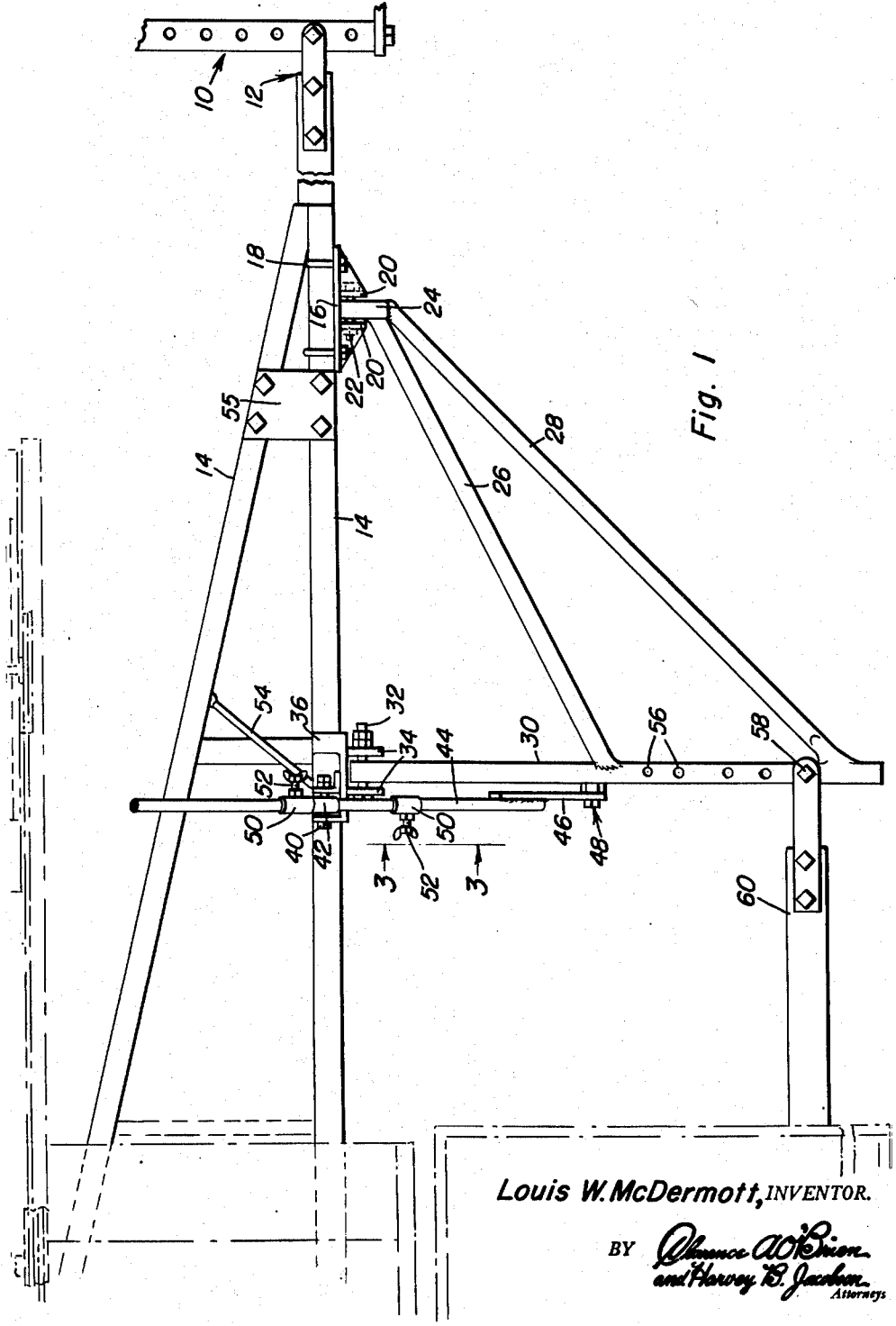
Figure 1 is a plan view of the tow bar of a combine with the novel draft hitch secured thereon and showing the conventional combine and trailer in broken lines.

Referring now more particularly to Figures 1 and 2, reference numeral 10 indicates generally the draft bar of a tractor or similar vehicle to which the tow bar clevis 12 of the combine is attached and, as is conventional, the combine tow bar consists of a plurality of longitudinally extending angle members 14 interconnected by suitable brace members. This tow bar is secured to any conventional combine structure indicated by the broken lines in the upper portion of Figure 1, such combines normally employing a material discharge chute which projects laterally of the combine structure which expresses a substantially continuous stream of harvested material when the combine is in operation. It is necessary to provide a trailer or wagon to receive the discharged material and from time to time it will be necessary to stop the operation of the combine to detach the filled trailer and attach an empty one, the filled trailer being independently transported to a central gathering point for the harvested material.

Accordingly, this invention contemplates the use of a draft hitch assembly which is secured to the tow bar mechanism of the combine and which will enable a trailer or other vehicle to be towed in juxtaposed relation to the combine so as to receive the harvested material. An anchor plate 16 is secured by U-bolts 18 to one of the longitudinal members of the tow bar and such a plate is provided with laterally off-set bracket ears 20 through which a pivot bolt 22 extends to pivotally secure the head 24 to the plate, see Figure 4. The head is rigidly carried by the convergent ends of a pair of brace rods or stays 26 and 28 which extend rearwardly therefrom and are attached to the intermediate portion and an end portion respectively of a draw bar 30.

The inner end of the draw bar is pivotally secured by bolt 32 to a pair of laterally projecting ears 34 which are carried by a generally channel-shaped member 36 which is securely fastened to two of the vertically aligned tow bar members 14.

The upper flange of the channel member is provided with a pair of spaced upstanding bracket ears 38 through which a pivot bolt 40 extends, which pivot bolt rotatably supports a collar 42. In this respect, it will be noted that the various pivot bolts 22, 32, and 40, are coplanar.

A support bar 44 is slidably received in the collar 42 and is suitably secured at one end to an extension member 46 which is pivotally connected at 48 to an intermediate portion of the draw bar and stop members 50 are adjustably received on the support bar at opposite sides of the collar 42 by virtue of the setscrews 52. To rigidify the assembly, a stay rod 54 is secured at its opposite ends to one of the bracket ears 38 and one of the longitudinal tow bar members 14 respectively and a reinforcing plate 54 is also provided adjacent the convergent ends of the tow bar members.

The free end of the draw bar 30 is provided with a plurality of longitudinally spaced apertures 56 which selectively receive a clevis bolt 58 for detachably securing the tongue 60 of a trailer or wagon to the draw bar assembly.

In operation, it will readily be seen that the draw bar assembly is vertically movable with respect to the combine tow bar by virtue of the colinear relationship of the pivot bolts 22 and 32 and such vertical movement is limited by the stop members 50. The stop member remote from the draw bar 30 may be adjusted longitudinally of the support bar 44 to abut the collar 42 and position the tow bar at any desired position relative to the ground, thus enabling wagon tongues to be attached and detached therefrom with a minimum of effort.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A draft hitch for use with combines comprising a draw bar pivoted at one end to a tow bar of a combine and having a plurality of apertures at its other end for selective connection to the tongue of a trailer, a brace leg pivoted at one end to the tow bar and secured at its other end to said draw bar, the pivotal connections of said draw bar and said brace being colinear, and means for limiting the pivotal movement of the draw bar and brace, said means comprising a support bar pivoted at one end to said draw bar and slidably received in a collar intermediate its ends, stop members on said support bar at either side of said collar, said collar being pivotally secured to the tow bar.

2. The combination of claim 1, wherein said stop members are adjustable longitudinally of said support bar.

3. A draft hitch for use with combines comprising an attaching plate adapted to be secured to the tow bar of a combine, a draw bar pivotally secured at one end to said plate, a second attaching plate adapted to be secured to the tow bar longitudinally of said first plate, a brace assembly pivotally secured at one end to said second plate and secured at its other end to said draw bar, a supporting member pivotally connected to said draw bar intermediate the ends of the latter and extending therefrom in overlying relation to said first attaching plate, a bracket on said second plate pivotally carrying a collar within which said supporting member is received, and stop means on said supporting member engageable with said collar for limiting pivotal movement of the draw bar.

4. The combination of claim 3, wherein said stop means comprises sleeves adjustably secured to said supporting member at opposite sides of said collar.

References Cited in the file of this patent

UNITED STATES PATENTS

| Number | Name | Date |
|---|---|---|
| 1,941,670 | Everett | Jan. 2, 1934 |
| 2,512,097 | Goodspeed | June 20, 1950 |
| 2,513,003 | Christensen | June 27, 1950 |